D. N. B. Coffin, Jr.
Capstan and Windlass.
No. 14,100. Reissued Aug. 16, 1870.
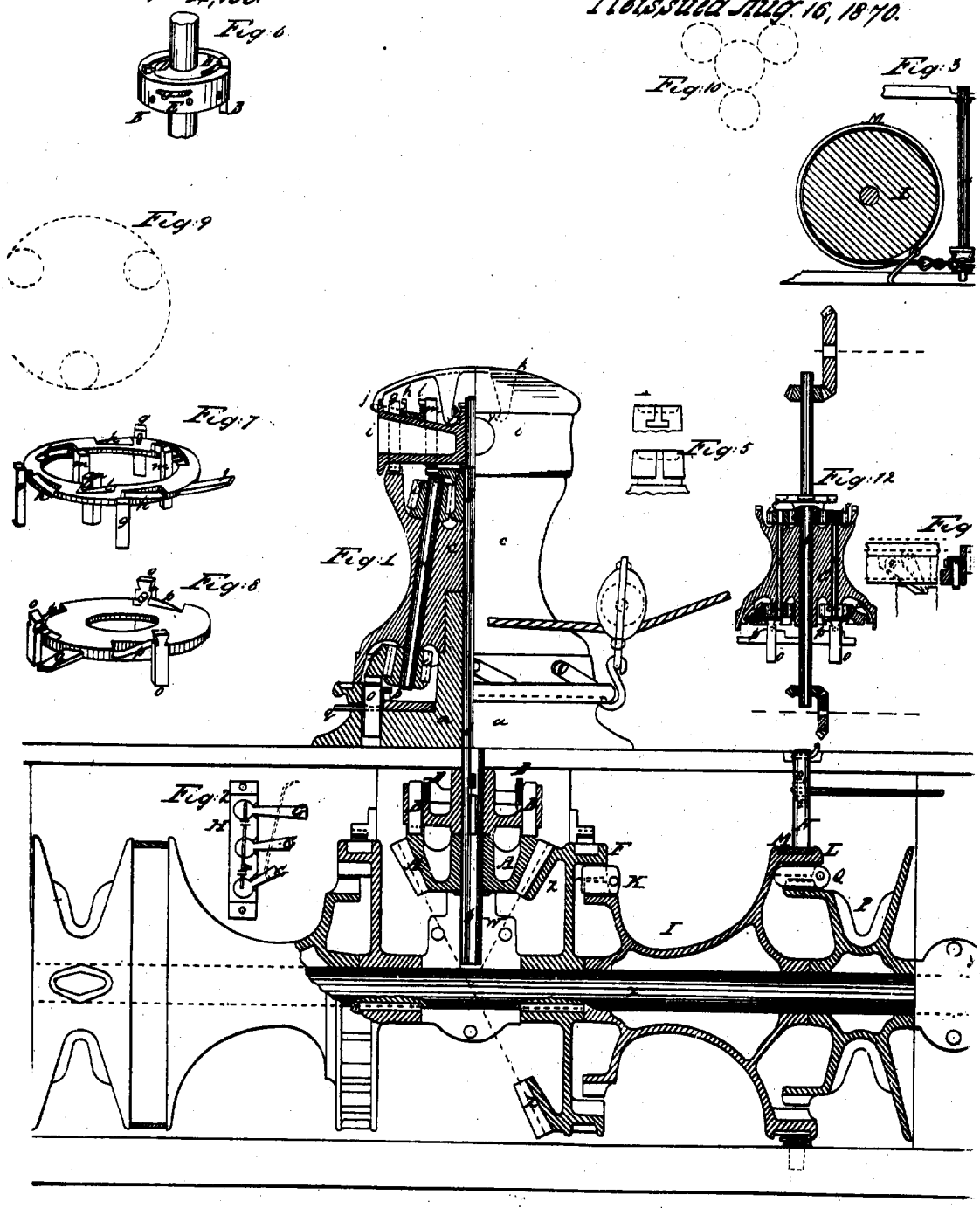
Inventor
D. N. B. Coffin Jr.

United States Patent Office.

DAVID N. B. COFFIN, JR., OF NEWTON, AND BENJAMIN WOODWARD, OF SOMERVILLE, MASSACHUSETTS, ASSIGNEES, BY MESNE ASSIGNMENTS, OF DAVID N. B. COFFIN, JR.

*Letters Patent No.* 59,969, *dated November* 27, 1866; *reissue No.* 4,100, *dated August* 16, 1870.

IMPROVEMENT IN CAPSTANS AND WINDLASSES.

The Schedule referred to in these Letters Patent and making part of the same

I, DAVID N. B. COFFIN, Jr., of Boston and of Newton, in the county of Middlesex and State of Massachusetts, have invented certain Improvements in Capstans and Windlasses, of which the following is a specification.

*Nature and Objects of the Invention.*

The nature of my invention relates to improvements in the construction of capstans and windlasses and to their combinations, for the purposes of greater convenience, effectiveness, and usefulness, as hereinafter more fully set forth.

*Description of the Accompanying Drawing.*

Figure 1 is a general sectional view of my improvements.

Figure 2 is a side view of the windlass, pawls, and sockets.

Figure 3 a separate view of the friction mechanism for controlling the windlass-barrel and chain-wheel when letting go anchor, &c.

Figures 4 and 5 are views of the hub of the lever-head, showing the sockets or grooves for fastening the cover.

Figure 6 is a separate view of the bolts and inclines, &c., for locking and unlocking the connection between the capstan and second capstan or windlass.

Figure 7 shows, separately, the system of bolts and the inclines for operating them, that are located in the capstan-head.

Figure 8 represents the bolts located in the capstan-base for locking the fulcrum, gear, &c., and the inclines which operate them.

Figure 9 shows the arrangement of gears *u f*.

Figure 10 shows the arrangement of gears *s t*. The number of these gears, however, may be varied according to the strength required, viz., the gears *s* and *u*.

Figure 11 shows how the fulcrum gear may be held by a self-acting lifter-pawl when a capstan is not required to operate in both directions.

Figure 12 shows the applicability of my improvement to that class of fulcrum-gear capstans where parallel shafts and gears are used instead of angular shafts and conical gears. It also shows the extension of the central shaft, above as well as below, for a combination there as well.

Like letters refer to the same or corresponding parts in all the figures.

*General Description.*

For examples of capstans upon which I improve see my rejected application of the year A. D. 1856, and my patent of 1865, (assigned.)

The capstan's base is designated by the letter *a*, and is furnished with the usual pawl-pockets, and also a groove under the projecting part, into which a block or other guide may be hooked to guide the rope when being wound from an elevation out of the proper level to cause it to wind properly on the barrel without guidance.

Through the center of the bed-plate is formed a bearing for the central shaft or spindle *b* to turn in.

This shaft *b* is keyed, squared, clutched, or otherwise made fast to the body of the capstan *c*, so as to turn with it.

In the body of the barrel *c* are arranged the shafts *d* or *e*, with a gear on each end, the upper gear, *s*, playing into a central gear, *t*, connected or connectable to the lever-head *i*, and the lower ones, *u*, playing into the fulcrum gear *f*.

In the lever-head *i* are arranged a series of vertically-movable bolts, *g*, which, by a partial rotary movement of the series of inclines *h*, are lifted or dropped, thereby connecting or disconnecting the barrel *c* to or from the lever-head *i*.

These inclines *h* are moved by the projection *j*, connected thereto, either directly or by turning the cover *k*, into which *j* is notched for the purpose.

The series of inclines *l* may be connected with inclines *h* to operate the bolts *m* in an opposite direction, to lock and unlock the central gear to and from the lever-head, in alternation with the locking and unlocking of the lever-head to the barrel directly, by bolts *g*.

The bolts *m* and inclines *l* may be omitted, and the center gear, *t*, permanently fastened to the lever-head *i* whenever the improved locking and suspension device is applied to the fulcrum-gear. This device I will proceed to describe.

A series of bolts, *o*, is fitted loosely in sockets in the bed-plate, so as to be movable vertically by means of a series of inclines, *p*, movable in a circular path by means of a projection, *q*.

The tops of these bolts *o* have double inclined faces corresponding to the double inclined-faced lugs on the bottom of the fulcrum-gear, so that, when it is desired to drive by the fulcrum-gear, the projection *q* is pushed by the foot or hand so as to lift bolts *o*, and with them the fulcrum-gear, and so lock it to the bed-plate by the interlocking of the bolts and lugs at the proper elevation to be acted on by the gears *u* on shafts *d* or *e*.

When only the simple power is required, the bolts *o* are dropped down again by moving *q* and inclines *p* in the opposite direction, so as to leave the fulcrum-gear in a state of suspension either upon the flanges of gears *u* or any other suitable attachment to the capstan-barrel, (see figs. 12 and 1.) When the fulcrum-gear is left in this suspended position it simply revolves with the capstan body, free and clear of all stationary or differently-moving parts, and, consequently, causes no friction. This device obviates any necessity for allowing the gearing to be driven when the simple capstan (or purchase) is required.

When a capstan is required only to operate in one direction, the fulcrum-gear may be elevated, locked, and dropped to its position of suspension by means of a series of pawls, as illustrated in fig. 11. These pawls, one of which is shown, are hung in the ordinary manner, except that a stop is furnished, so that, when the gear *u* and *f* act against the pawl, causing it to rise and lift the fulcrum-gear, as indicated by dotted lines, to the proper elevation, this stop will prevent the further movement of the pawl, so that, as long as the action of the gears continues, it will hold the fulcrum-gear locked at the proper height, and, the end of the pawl and its socket being properly inclined, the fulcrum-gear cannot rise higher.

When the action of the gears ceases, the pawl, standing at an inclination, will allow the fulcrum-gear to drop down again to its position of suspension, and, on the capstan being worked with simple power, (or purchase,) the pawls drag over the pockets, as in ordinary cases.

The cover fastening is as follows:

Cast or otherwise fastened to it is the lug *r*, one, two, or more.

In the hub of the lever-head are cast or otherwise formed grooves or sockets in corresponding relation to the lugs, (see figs. 1, 4, and 5,) so that, by dropping the cover down, the lugs passing through the vertical part of the grooves, and then partially rotating the cover, the lugs *r* catch under the horizontal part of the grooves and hold the cover on, and, by giving a slight inclination to the top of the groove or lug, the cover will be tightly held to the head.

I make a notch in the cover at such a point that, when the projection *j* is at its center of movement, the notch being placed thereon, the lugs *v* will be directed into the vertical part of the grooves in the hub; then a stop is formed on the head on either side of the projection *j*, so that, if the cover be turned one way till the projection strikes the stop, the bolts *g* are let into action, and the head is locked for simple power.

When turned in the opposite direction to the stops the bolts *g* are lifted and the gear *t* comes into action, so as to bring the multiplied power into use either by the dropping into action of the bolts *m* or by the permanent connection of gear *t* to the lever-head, and at either extreme of the movement of the cover it is fastened by the lugs *v* and grooves, as explained, while at the intermediate position it may be lifted off.

When it is desired to apply this capstan to the operation of a windlass, the shaft *b* is extended below (or above, as the case may require,) to a bearing, *w*, of the windlass.

The windlass-shaft *x* is sustained also in bearing *y*, and is provided with a bevel-gear wheel, *z*, fast to the shaft, and playing into gear A on shaft *b*.

This gear A is loose, but may be locked to the shaft at pleasure by means of bolts B, which drop into notches or pockets upon the gear.

These bolts are carried in a part securely fastened to shaft *b*, as shown in figs. 1 and 6, and are lifted and dropped into action by means of the inclines D, which are movable in a circular path by means of the projection E.

Gear Z has secured to it a pawl-wheel or ratchet, F, and a series of pawls, G, are arranged to play into it in the usual manner. I, however, construct these pawls with a partly circular head, and cast correspondingly shaped sockets, into which I insert them loosely.

A simple guard, H, keeps them in. All fitting of pins and screwing or otherwise fastening them in is saved, great strength secured, with great facility of removal.

The windlass-barrel I turns freely on the shaft *x*, but may be locked and unlocked from the pawl-wheel and gear Z at pleasure, by means of key or block K, which fits into recesses in I and F.

On barrel I is formed a friction-wheel, L, which bears the friction-strap M, (see fig. 1 and fig. 3.)

One end of this strap is made fast to some stationary object, while the other end is jointed by a chain or other suitable connection to the windlass-shaft N, which extends upward and downward to all desirable points for working it, and has lever-sockets at all such points, so that, by turning this shaft, strain is applied to the friction-strap, whereby may be controlled the movements both of barrel I and anchor-chain wheel P, the chain-wheel P, being loose on the shaft, but connectable at pleasure for joint operation with barrel I by means of a key or block, Q, fitted removably to recesses in both P and L.

On the opposite side of shaft *b* the windlass-shaft may be extended, (see drawing,) and all the parts duplicated in symmetrical order from the ratchet-wheel, like F, to the chain-wheel, like P, as is often required.

When a second upright windlass or capstan is required, it is only necessary to fit a barrel to the extension of shaft *b* and furnish it with notches or lugs for bolts B to take, or it may be keyed directly to the shaft. It will be observed that this capstan and windlass may be operated equally well in either direction. When the windlass is operated in one direction, the upper capstan-pawls will be depended on as when running chain out of the locker.

An additional set of windlass-pawls may, however, be arranged opposite to those shown, or over the pawl-wheel, if required, for heavy work in that direction.

In the part carrying bolt B I show pockets for levers, to be used in case it is required to rotate the windlass below, (see fig. 6.)

*Claims.*

1. The combination of the partially-rotatory cap or cover and the locking or sliding bolts, for the purpose of connecting the lever-head to the barrel, or disconnecting the same therefrom, substantially as set forth.

2. Fastening the cover of a capstan by means of lugs *v* in combination with sockets or grooves in the hub, substantially as described.

3. The arrangement of the cover-fastening in relation to the locking mechanism of the capstan, so that, when the cover is rotated to a stop in one direction, the bolts will be adjusted for the simple power, and the cover fastened, and, when rotated in the opposite direction to a stop, the cover will also be fastened and the bolts adjusted for the multiplied power, while in an intermediate position the cover is unfasted, and may be removed, substantially as described.

4. The employment of the shaft *b*, extended from the capstan, in combination with the shafts *d* or *e*, with suitable gears, as *u*, *f*, *s*, and *t*, substantially as described.

5. Locking the fulcrum-gear of a capstan to the bed-plate by means of bolts movable upward from beneath into contact therewith, substantially as described.

6. The employment of a series of inclines, movable in a circle, and so applied in combination with the fulcrum-gear of a capstan as to lift said gear from its position of inaction to the proper position to be acted on by gears playing into it, substantially as described.

7. Suspending the fulcrum-gear to the rotating body of the capstan.

8. The arrangement of the gears A Z, pawl-wheel F, barrel I, friction L, and chain-wheel P, and the points of disconnecting, whereby both barrel I and chain-wheel P are brought under control of the friction mechanism, and yet used separately for winding, heaving in, &c., substantially as described.

9. The windlass-shaft N, in combination with the friction-band and barrel of a windlass, substantially as described.

10. The partly-circular heads and sockets, in combination with the pawls of a windlass, substantially as described.

11. A groove formed under the projecting part of a capstan's base, substantially as and for the purpose set forth.

DAVID N. B. COFFIN, JR.
BENJAMIN WOODWARD.

Witnesses:
A. K. CROWELL,
LYSANDER BURNETT.